(12) United States Patent
Kall et al.

(10) Patent No.: US 7,383,050 B2
(45) Date of Patent: Jun. 3, 2008

(54) PROVIDING LOCATION INFORMATION OF A USER EQUIPMENT

(75) Inventors: Jan Kall, Espoo (FI); Tomi Varonen, Helsinki (FI)

(73) Assignee: Nokia Corporation, Espoo (FI)

( * ) Notice: Subject to any disclaimer, the term of this patent is extended or adjusted under 35 U.S.C. 154(b) by 10 days.

(21) Appl. No.: 10/518,365

(22) PCT Filed: Jun. 20, 2003

(86) PCT No.: PCT/IB03/03182

§ 371 (c)(1),
(2), (4) Date: Jan. 31, 2005

(87) PCT Pub. No.: WO04/002183

PCT Pub. Date: Dec. 31, 2003

(65) Prior Publication Data

US 2005/0202780 A1 Sep. 15, 2005

(30) Foreign Application Priority Data

Jun. 21, 2002 (GB) ................................ 0214380.8

(51) Int. Cl.
*H04Q 7/20* (2006.01)
(52) U.S. Cl. ................ 455/456.1; 455/457; 455/404.2; 342/357.09; 342/457
(58) Field of Classification Search ............ 455/456.1, 455/456.2, 456.3, 457, 404.2; 342/357.09, 342/457, 45
See application file for complete search history.

(56) References Cited

U.S. PATENT DOCUMENTS 5,043,736 A * 8/1991 Darnell et al. ............ 342/357.1
5,918,181 A * 6/1999 Foster et al. ............. 455/456.1
5,924,027 A * 7/1999 Valentine et al. ........... 455/417
6,134,447 A * 10/2000 Havinis et al. .......... 455/456.6
6,169,899 B1 1/2001 Havinis et al.
6,603,976 B1 * 8/2003 Amirijoo et al. ........ 342/357.1
6,708,033 B1 * 3/2004 Linkola et al. ............. 455/440
6,879,835 B2 * 4/2005 Greene et al. ........... 455/456.1
6,901,262 B2 * 5/2005 Allison et al. ........... 455/456.1
2003/0157942 A1 * 8/2003 Osmo ......................... 455/456

FOREIGN PATENT DOCUMENTS

WO    WO 01/52569 A    7/2001

\* cited by examiner

*Primary Examiner*—Nghi H. Ly
(74) *Attorney, Agent, or Firm*—Squire, Sanders & Dempsey, L.L.P.

(57) ABSTRACT

In a communication system, a method for providing a location service with geographical location information associated with a user equipment capable of communicating with the communication system is disclosed. The method includes the steps of: storing connection information identifying a connection of the user equipment in the communication system; and determining whether the user equipment is currently connected in the network. Wherein, responsive to the user equipment not currently being connected in the network, the location of the user equipment is determined in dependence on the last stored connection information for the user equipment. The method also includes the step of translating the connection information into geographical coordinates.

18 Claims, 2 Drawing Sheets

PROVIDING LOCATION INFORMATION OF A USER EQUIPMENT

FIELD OF THE INVENTION

The present invention relates to provision of geographical location information concerning the location of a user equipment used in a communications system.

BACKGROUND OF THE INVENTION

A cellular telecommunications system is based around cells or similar radio coverage areas. Examples of cellular telecommunications systems are well-known. In general, a cell coverage area or radio transceiver station coverage area of a telecommunications system can be defined as a certain geographically limited area covered by one or several base transceiver stations (BTS) serving mobile stations (MS) via an air or radio interface and usually connected to a base station subsystem (BSS). Each of the coverage areas of the system can be controlled by an appropriate controller apparatus. The controller is connected further to a gateway or linking apparatus, such as a gateway GPRS support node (GGSN) or gateway mobile switching center (GMSC), linking the cell to the other parts of the communication system. Several cells connected to each other cover a larger geographical area, and thus several cells form together the coverage area of a cellular telecommunications network.

Cellular telecommunications systems comprise a registration functionality in order to be able to control the movements and operation of the mobile stations subscribing to the cellular telecommunications network. Each station subscribing to a cellular telecommunications network is permanently registered in the network system which stores subscriber related data. This data may be the current location of the mobile station so that continuous track of the location can be kept for the purposes of call routing. In the GSM terminology, the permanent location registers are often referred to as home location registers (HLR). Each network may comprise one or several permanent or home location registers. The register can be a stand-alone network element or the register can be built into a network controller or into any other network element.

The permanent location register can also be implemented in a location server node. For instance, GSM based systems may include a gateway mobile location center (GMLC) which is used as both a permanent location register and a location service. This type of arrangement is particularly advantageous for subscribers who do not roam outside their home network, but may also be used for other types of subscribers.

In addition to the permanent registers, the cellular telecommunications networks comprise temporary or visitor location (VLR) registers. These temporary registers handle only temporary i.e. visiting subscribers, i.e. the mobile stations within the service area of the associated network controller at a given point of time. The temporary location register keeps track of the given service area within which the mobile station may be located and is constantly informed of whether the mobile station is ON or OFF. Each network controller may have its own visitor location register or the network controllers may share a stand-alone visitor location register or a visitor location register disposed within another network element.

The user equipment or mobile station communicates with an appropriate network controller and provides the controller with various kinds of information.

The use of cells or similar geographically restricted and known radio coverage areas and associated controllers facilitates the telecommunications system to produce at least a rough location estimate concerning the current location of an individual mobile station. More particularly, the telecommunications system is always aware (at least roughly) of the current location of such mobile stations which are communicating with at least one of the base stations of the system and are thus registered within at least one of the location registers of the system (i.e. are located within one limited radio coverage area of the system). This information is available even when the mobile station is located within a coverage area of a visited or "foreign" network, as the visited network is capable of transmitting the location of the mobile station back to the home location register, e.g. for the purposes of routing and charging. It is also possible to input location information provided by an external system for providing location information of a station into the telecommunications system, and to subsequently process and utilize this location information in the telecommunications system.

There have been proposed several techniques for providing the last known location of a mobile station, in particular with a time-stamp identifying when the location was calculated. This feature can be provided by a separate network element or server which receives the information from the various controllers of the system. More particularly, the determination of the location of the mobile user can be based on the location information received from databases of the visited controllers of the telecommunications system, e.g. from a visitor location register (VLR) in the GSM system. This type of arrangement would give the location to within of one base station or cell, i.e. it would indicate that the mobile station is (or at least was) within the coverage area of a certain base station or cell. The accuracy of the location determination can be improved by e.g. utilizing results of measurements which define the travel time (or travel time differences) of the radio signal sent by the mobile station to the base station.

A number of known techniques introduce disadvantages, particularly in increasing the signaling load in the communication system. In addition, regular and frequent updating of current location information requires additional memory resources in the communication system.

WO 01/28269 in particular discloses an improved technique providing location information of a user equipment. This technique applies a method wherein location information is not automatically provided to the location services.

Thus there is a compromise to be found between having the most up to date information for user equipment, with minimizing signaling and memory requirements in the system. As a result, location information for a particular user equipment may be out of date at a particular time it is requested.

A more particular problem arises when user equipment becomes disconnected from the network, for example because the user equipment has moved to a geographical are wherein there is no network coverage. In such a scenario, the last stored location information may be relatively old and unreliable.

It is an aim of the embodiments of the invention to address one or several of the above problems and also to provide a solution by means: of which the interaction of the location registers of a communication system may be made more efficient without causing excessive load to the system and/or by means of which a more efficient use of memory resources of the system can be achieved.

SUMMARY OF THE INVENTION

According to the present invention there is provided a method in a communication system for providing a location service with geographical location information associated with a user equipment capable of communicating with the communication system, the method comprising the steps of: storing connection information identifying a connection of the user equipment in the communication system; and determining whether the user equipment is currently connected in the network, wherein responsive to the user equipment not currently being connected in the network, the location of the user equipment is determined in dependence on the last stored connection information for the user equipment, the method further including the step of translating the connection information into geographical coordinates.

The connection information may include a service area identity. The connection information may include a cell global identity The location service may be provided by a gateway mobile location center. The gateway mobile location center may be adapted to communicate with a gateway mobile location center of a further communication system.

The connection information may be stored in a control element of the communication system. The connection information may be stored in a radio network controller of the communication system. The connection information may be stored in a mobile switching center of the communication system. The connection information may be stored in a serving GPRS support node of the communication system. The connection information may be stored in a serving mobile location center of the communication system.

The step of translating the connection information into geographical coordinates may be carried out by a location service.

According to a further aspect, the present invention provides a communication system comprising a location server for providing geographical location information associated with a user equipment capable of communicating with the communication system; and a network element for storing connection information identifying a connection of the user equipment in the communication system and for determining whether the user equipment is currently connected in the network, wherein responsive to a request from the location server for location information when the user equipment is not currently connected in the network, the network element provides the location server with details of the connection information last stored for the user equipment, and wherein the, location server translates the connection information into geographical coordinates.

The connection information may include a service area identity or a cell global identity.

The location server may be provided by a gateway mobile location center.

The gateway mobile location center may be adapted to communicate with a gateway mobile location center of a further communication system.

The network element may be one or all of a radio network controller; a mobile switching center of the communication system; a serving GPRS support node of the communication system; or a serving mobile location center of the communication system.

The communication system may comprise a cellular telecommunications network.

The user equipment may comprise a mobile station.

By means of the proposed embodiments it is possible to use a communication system in a more efficient manner for providing geographical location information for a location service.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

Figure 1:
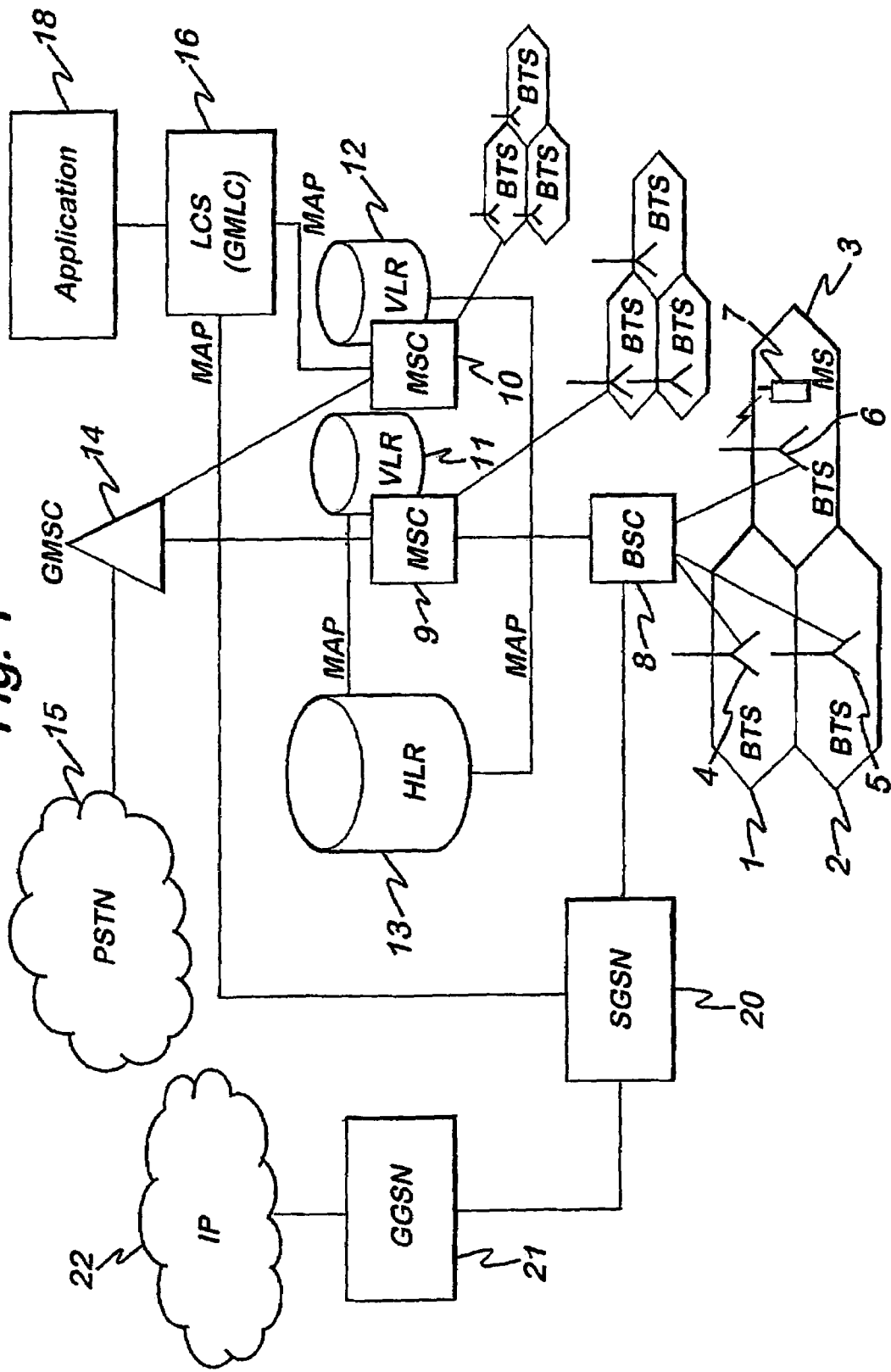
FIG. 1 shows a schematic diagram of a cellular radio network system in which embodiments of the invention can be implemented.

Reference will first be made to FIG. 1 illustrating a general view of one possible mobile telecommunications system having a location service. It is noted that even though the exemplifying telecommunications network shown and described in more detail in the following uses the terminology of a circuit switched GSM (Global System for Mobile communications) public land mobile network (PLMN), the proposed solution can be used in any system providing communications between a transmitting station and a receiving station and some degree of location functionality for at least one of the stations. It should also be appreciated that even though FIG. 1 shows three base station groups which each provide three omnidirectional radio coverage areas 1, 2 and 3, the embodiments of the invention can be implemented using any number of radio coverage areas. The coverage areas 1, 2 and 3 can also be, instead of base station coverage areas, three cell coverage areas of the mobile communications network, where the coverage area of one cell includes more than one base station. It is also possible to group several cells such that one coverage area comprises more than one cell. For example, URA (UMTS Terrestrial Radio Access Network Registration Area) in the UMTS standard consists of a group of cells. It is also noted that the radio coverage area can consist of a sector base station provided with a directional or sector antenna (not shown). The sector base station may use e.g. three 120° directional antennas whereby three radio coverage areas are provided, or four 90° directional antennas providing four radio coverage areas and so on, or any combinations of different radio coverage beam widths. It should also be appreciated that base stations can sometimes be referred to as node B (e.g. in the UMTS standard).

Each cell of the communication system has a unique cell global identity (CGI), which uniquely identifies that cell. In addition, the communication system provides service area identities (SAIs) corresponding to service areas provided by the communication system's radio network coverage.

In FIG. 1 each radio coverage area 1, 2 and 3 is served by a respective base transceiver station (BTS) 4, 5 and 6. Each base transceiver station BTS is arranged to transmit signals to and receive signals from a mobile station (MS) 7 or other user equipment in the cell. Likewise, the mobile station 7 is able to transmit signals to and receive signals from the respective base transceiver station. Typically a number of mobile stations will be in communication with each base station although only one mobile station is shown in FIG. 1 for clarity.

Each of the base stations is connected to a respective network controller, which in one form of the exemplifying GSM system comprises a base station controller 8 connected further to a Mobile Switching Centre (MSC) 9. However, as is also shown by FIG. 1, in some arrangements the base station controller 8 controlling one or several base stations between the network controller and the base stations can be omitted. Regardless of the implementation, some kind of controller functionality is provided for controlling the base stations. Each of the network controllers controls its service area, i.e. the cells and base stations connected to it, either directly or via the base station controller. More than one base station or base station group can be connected to each network controller. Typically more than two network controllers are also provided in a network. The network controller is connected to other elements or parts of the telecommunications network system via a suitable linking or gateway apparatus, such as Gateway Mobile Switching Centre (GMSC) 14.

The implementation of the communication between the mobile station and the controller is known, and will thus not be discussed in more detail herein. It is sufficient to note that the interface may comprise channels in both uplink and downlink direction between the mobile station in the cell associated with a given base station and the controller of that base station. The information sent to the mobile station and the data sent from the mobile station can be in packet form (e.g. in GPRS, WCDMA or UMTS systems). However, other formats for transmitting information are not excluded and in alternative embodiments of the invention the data may thus be sent in any suitable format. The messages including the information packets (or similar data units) which are sent from the mobile stations can include information identifying the mobile station (for instance, MS ID and/or IMSI (Mobile Station Identity and/or International Mobile Subscriber Identity, respectively)), and thus the message includes information which allows the communication system to identify from which mobile station the message has been received.

FIG. 1 also illustrates the possibility of using a packet switched mobile telecommunications service for communication with a data network 22. The illustrated GPRS (General Packet Radio Service) system is based on GSM technology and may use the existing GSM base stations and other network elements for its operation. The GPRS system includes a serving GPRS support node (SGSN) 20, corresponding substantially to the MSC of the GSM network, for controlling the service area; and a gateway GPRS support node (GGSN) 21 for interfacing with the data network, for example the TCP/IP (Transport Control Protocol/Internet Protocol) Internet 22. In the GPRS system the network controller SGSN 20 is arranged to pass on data packets to be transmitted to the mobile station 7 by the respective base station. The controller will also receive from the base station packets of data that it has received from the mobile station.

The mobile station 7 is able to move from one radio coverage area to another coverage area, e.g. from cell 1 to cell 2 or from one cell group to another cell group. The location of the mobile station 7 may thus vary in time as the mobile station is free to move from one location (base station coverage area or cell coverage area) to another location (to another coverage area) and also within any particular coverage area. To ensure proper operation of the system and to avoid disconnecting a possibly ongoing call, handover procedures are provided so that all necessary information will become available for the parties involved (e.g. for the previous and new network controller). The mobile station may also be in communication with more than one base station, e.g. during a so-called soft handoff procedure.

In order to be able to control a roaming mobile station communicating with different base stations of the mobile telecommunications network the mobile station is registered permanently with a particular home location register and temporarily to a visitor location register. In the example of FIG. 1 the mobile telecommunications network comprises a stand-alone home location register 13 and both of the MSCs 9 and 10 comprise a Visitor Location Register (VLR) 11 and 12, respectively. The mobile station 7 of FIG. 1 is registered both in the HLR 13 of the mobile telecommunications network and in the VLR 11 of the visited service area. A mobile telecommunications network may include several home location registers and the home location registers may be included in one or several of the network controllers. The home and visitor location registers can communicate with each other e.g. over a MAP (Mobile Application Part) interface or any other suitable interface.

The arrangement is such that the MS 7 is registered permanently to the HLR 13. The HLR 13 centrally and permanently stores all subscriber information associated with the particular MS 7.

This information stored in the HLR can include various user related information and the location information for this particular MS. The VLR, such as VLRs 11 or 12, is used for storing information relating to the mobile stations visiting the service area of the MSC associated with the VLR. The visited VLR is capable of providing the HLR with location information concerning the current location of the MS 7 and any possible updates of the location information.

FIG. 1 shows also a Location Services (LCS) node 16 providing Location (LC) services for different applications or clients 18 who are entitled to receive at least some degree of information concerning the geographical location (or location history) of a mobile station. The clients may be external, i.e. clients outside the communication system. The clients may also be internal, i.e. the functionalities of the communication system may use the defined geographical location information for the operation of the system (for instance, resource allocation location assisted handover, fleet management or location related billing). A more detailed proposal for location services can be found from ETSI (European telecommunications Standards Institute) technical specification GSM 03.71 and the corresponding 3GPP specifications 23.271 and 25.305. In general terms, the LCS functionality can be defined as a feature capable of providing information concerning the geographical location of a particular mobile station. The geographical location of the mobile station may be defined on the basis of the position of the mobile station relative to the base station(s) of the mobile telecommunications system. The location server node 16 is arranged to receive predefined data concerning the geographical location of the mobile station 7 and to process this data and/or some other predefined parameters and/or to compute appropriate calculations for determining and outputting the geographical location of the given mobile station. The location server may also be arranged to check the client's (i.e. the particular application 18) right to receive any information.

The location server 16 is connected to one or several of the network controllers of the telecommunications system. Thus there is a connection between the MSC 10 and the LCS server or node 16 providing a connection for the VLR 12 towards the server 16; a connection between the LCS 16 and the MSC 10; and a connection between the LCS 16 and the SGSN 20. It is also possible to have a direct connection between the location server 16 and one or several visitor location registers 11 and 12 (not shown). It is also noted that even though the LCS node 16 is shown as a stand-alone element, it could be a part of an internal component or functionality of any of the controllers or gateway controllers or any other element of the telecommunications system. The LCS node 16 in one PLMN also may be connected to a similar LCS node 16 in another PLMN.

In one particular embodiment the location services of the server 16 may be implemented as a gateway mobile location center (GMLC).

In the example implementation of FIG. 1, the location information is transmitted from the network nodes (xx MSC or yy SGSN) to the location server 16 in response to a request by the location server. The location server 16 may also request location information updates periodically from the network nodes, or the network nodes may provide the location server automatically with updated location information in the event of a change in the location of the mobile station, or in the event when the mobile station becomes available. The network nodes xx or yy generate and attach a time stamp to the location information, i.e. the age of the location information. The timestamp indicates the time elapsed since the location data was generated.

However, if the location server is informed of every single change in the position of the mobile station by the network node, such as the current MSC or SGSN, this could in some instances cause a substantial amount of signaling load which could have an adverse influence on the overall operation of the communications system. For this reason, there has been proposed techniques in which location information is provided to the location server or the location service functionality on a selective basis, e.g. only at certain time intervals. The implementation of techniques for providing the location server or GMLC, (16) with location updates is outside the scope of the present invention.

In accordance with the present invention, the communication system of FIG. 1 is adapted to provide an improved estimation of the location of the user equipment in situations where the user equipment is no longer reachable. The user equipment may not be reachable because it has been switched off, or because it is outside the network coverage area. In such situations, the normal location information parameters may be out of date, such that the formation provided thereby is unreliable or misleading.

Figure 2:
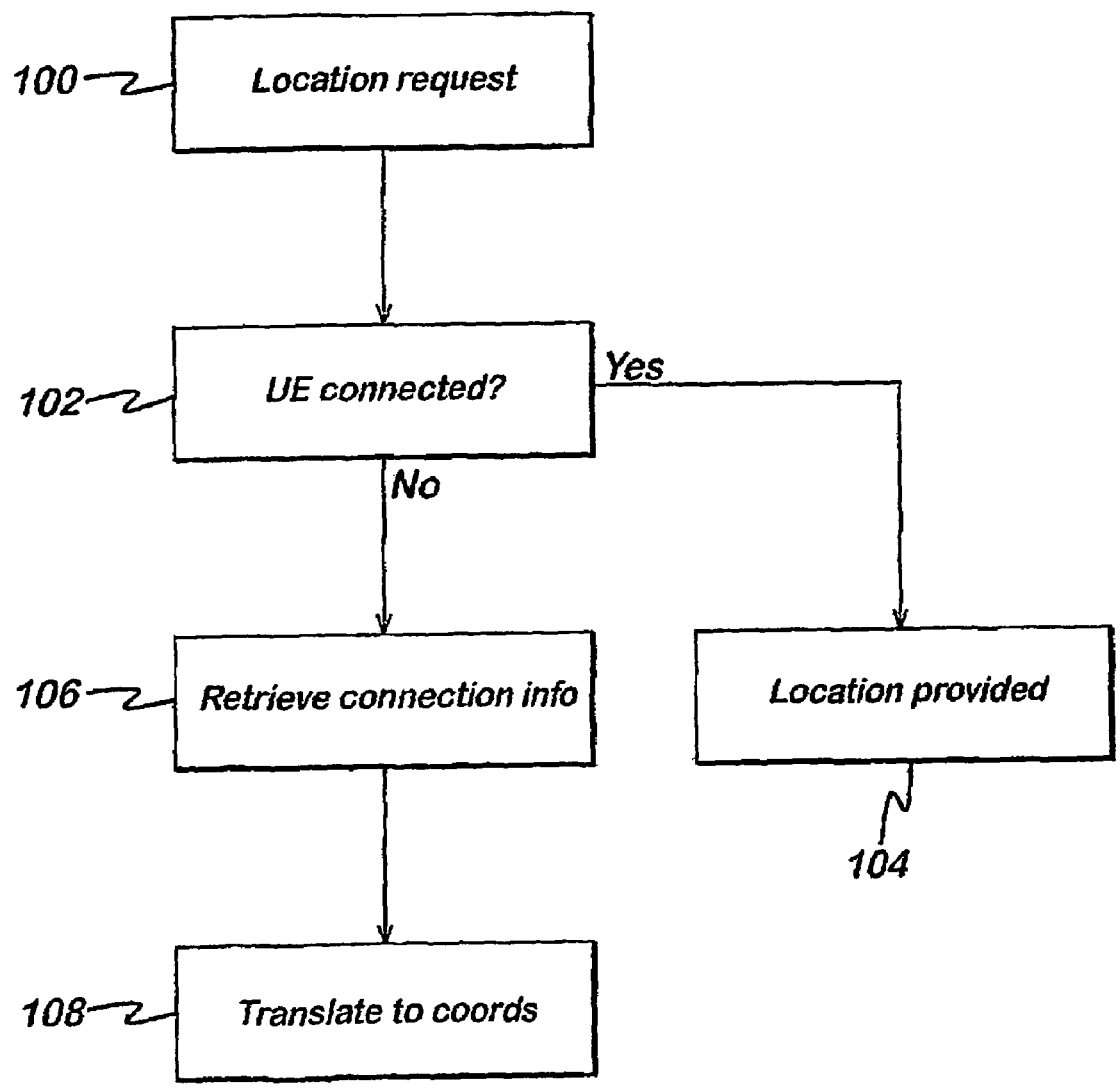
FIG. 2 is a flow chart for operation in accordance with an embodiment of the present invention.

Referring to FIG. 2, there is illustrated an example implementation of the present invention in a communication system such as illustrated in FIG. 1.

In a first step 100, the location service, such as the GMLC, requests the last known location of the mobile station 7. In a step 102, the supporting network controller, for example the MSC 9, determines whether the mobile station 7 is currently reachable or not, i.e. whether it is connected in the network. In 3G networks, the RNC may perform this check.

If the mobile station is currently connected in the network, then in a step 104 the communication system proceeds to provide the GMLC with the location information available using known location techniques.

If the mobile station is currently not connected in the network, then in a step 106 the MSC 9, or the radio network controller (RNC), or in an alternative implementation the serving mobile location center (SMLC), provides the last known connection information for the mobile station to the location service or GMLTC 16 from the MSC or SGSN. The connection information is preferably a service area identity or a cell identity. This connection information is preferably provided by the serving GPRS support node (SGSN) or the mobile switching center (MSC).

In the currently standardized solution the MSC/SGSN are not allowed to send or forward the network connection information, such as the SAI or cell identity, to the location services or GMLC. According to this invention, however, functionality is added to allow the MSC or SGSN to send the SAT or cell identity to the GMLC. Once the GMLC retrieves this information, in a step 108 the GMLC translates the network connection information, such as the SAI or cell I.D. into geographical coordinates. Since normally only the operator of a network knows the geographical coordinates that correspond to a given SAI or cell identity, normally only the GMLC in the operator's network is able to do the translation. This also means that the GMLCs of different networks should be preferably interconnected, so that the informed GMLC can be requested to do the translation.

In an alternative, the network element such as the RNC, SMLC, SGSN, MSC may perform the translation of the connection information into geographical coordinates directly. This alternative does not require any changes in the signaling standards, only an adaptation of existing signaling mechanisms.

The operation of location determination of user equipment based on conventional techniques is outside the scope of the present invention, and any known technique may be used in step 104. However, in a preferred embodiment the technique disclosed in WO 01/28269 is utilized.

The location information provided to the telecommunications system or an external location system may be used for purposes other than call processing, such as for routing, charging, resource allocation, handover proceedings and so on. There are several possible commercial and non-commercial applications which may use the geographical location information if it is readily available. These possible applications include: different local advertisement and information distribution schemes e.g. transmission of information directed to only those mobile users who are currently within a certain location area; area related WWW-pages such as time tables, local restaurant guides, shop guides or hotel guides, maps, local advertisements and so on; location of those who have called to an emergency number; and tracking of mobile users by anyone who wishes to receive this information and is legally entitled to obtain it. An application requiring precise and real-time location information of the movement of a mobile station is a mobile station movement prediction feature that could be utilized, for example, in dynamic network resource allocation and in handover procedures. There are various other possible uses of the location information and applications which may use the location information. In general, all applications which need geographical location of the mobile station may find the location information provided and/or processed by means of the communications system useful. The usability of the location information is increased by improving the accuracy and reliability of the location information provided by the communications system.

It should be appreciated that whilst embodiments of the present invention have been described in relation to mobile stations, embodiments of the present invention are applicable to any other suitable type of user equipment.

The embodiment of the present invention has been described in the context of a GSM system which utilizes a time division multiple access (TDM). This invention is also applicable to any other access techniques including frequency division multiple access (FDMA) and code division multiple access (CDMA) as well as any hybrids thereof.

It is also noted herein that while the above describes exemplifying embodiments of the invention, there are several variations and modifications which may be made to the disclosed solution without departing from the scope of the present invention as defined in the appended claims.

The invention claimed is:

1. A method in a communication system for providing a location service with geographical location information associated with a user equipment capable of communicating with the communication system, the method comprising:
   storing connection information identifying a connection of the user equipment in the communication system; and
   determining whether the user equipment is currently unreachable in the network, wherein if the user equipment is currently unreachable in the network, the location of the user equipment is determined in dependence on the last stored connection information for the user equipment and wherein the connection information includes a service area identity or a cell global identity, the method further including translating the connection information into geographical coordinates.

2. A method according to claim 1, wherein translating the connection information into geographical coordinates is carried out by a location service.

3. A method according to claim 1, wherein the communication system comprises a cellular telecommunications network.

4. A method according to claim 1, wherein the user equipment comprises a mobile station.

5. A method according to claim 1, wherein the location service is provided by a gateway mobile location center.

6. A method according to claim 5, wherein the gateway mobile location center is adapted to communicate with a gateway mobile location center of a further communication system.

7. A method according to claim 1, wherein the connection information is stored in a control element of the communication system.

8. A method according to claim 7, wherein the connection information is stored in a radio network controller of the communication system.

9. A method according to claim 7, wherein the connection information is stored in a mobile switching center of the communication system.

10. A method according to claim 7, wherein the connection information is stored in a serving GPRS support node of the communication system.

11. A method according to claim 7, wherein the connection information is stored in a serving mobile location center of the communication system.

12. A communication system comprising:
    a location server for providing geographical location information associated with a user equipment capable of communicating with the communication system; and
    a network element for storing connection information identifying a connection of the user equipment in the communication system and for determining whether the user equipment is currently unreachable in the network,
    wherein, responsive to a request from the location server for location information, if the user equipment is currently unreachable in the network, the network element provides the location server with details of the connection information last stored for the user equipment, the connection information including a service area identity or a cell global identity, and wherein the location server translates the connection information into geographical coordinates.

13. A communication system according to claim 12, wherein the location server is provided by a gateway mobile location center.

14. A communication system according to claim 13, wherein the gateway mobile location center is adapted to communicate with a gateway mobile location center of a further communication system.

15. A communication system according to claim 12, wherein network element is one or all of a radio network controller; a mobile switching center of the communication system; a serving GPRS support node of the communication system; or a serving mobile location center of the communication system.

16. A communication system according to claim 12, wherein the communication system comprises a cellular telecommunications network.

17. A communication system according to claim 12, wherein the user equipment comprises a mobile station.

18. A communication system, comprising:
    providing means for providing geographical location information associated with a user equipment capable of communicating with the communication system; and
    storing means for storing connection information identifying a connection of the user equipment in the communication system and for determining whether the user equipment is currently unreachable in the network,
    wherein, responsive to a request from the providing means for location information, if the user equipment is currently unreachable in the network, the storing means provides the providing means with details of the connection information last stored for the user equipment, the connection information including a service area identity or a cell global identity, and wherein the providing means translates the connection information into geographical coordinates.

* * * * *